No. 845,956. PATENTED MAR. 5, 1907.
A. S. LANGSDORF.
FREQUENCY INDICATOR.
APPLICATION FILED SEPT. 6, 1906.

WITNESSES. INVENTOR
A. S. Langsdorf.
BY
ATTORNEYS

_UNITED STATES PATENT OFFICE._

ALEXANDER S. LANGSDORF, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

FREQUENCY-INDICATOR.

No. 845,956.  Specification of Letters Patent.  Patented March 5, 1907.

Application filed September 6, 1906. Serial No. 333,473.

*To all whom it may concern:*

Be it known that I, ALEXANDER S. LANGSDORF, a citizen of the United States, residing at the city of St. Louis, in the State of Missouri, have invented a certain new and useful Frequency-Indicator, of which the following is such a full, clear, and exact description as will enable any one skilled in the art to which it appertains to make and use the same, reference being had to the accompanying drawings, forming part of this specification.

My invention relates to a frequency indicator or meter, and depends upon the principle that if an alternating current be impressed upon a circuit containing a condenser the current expressed in amperes will equal $2\pi$ times the product of the frequency, the electromotive force of the current in volts, and the capacity of the condenser in farads. If, therefore, an ammeter is contained in such a circuit, the indications of its pointer will be proportional to the frequency of the current, provided the electromotive force remains constant. In practice, however, the electromotive force of the current the frequency of which is to be indicated will vary, and consequently the indications of an ammeter situated as above described would vary with the electromotive force, and if such an instrument were used to indicate frequency the variations, due to the change in electromotive force, would give rise to apparent changes in frequency. To overcome this difficulty, I provide a movable scale coöperating with the pointer of the instrument, the direction and amount of movement of such scale due to changes in electromotive force being the same as the direction and amount of movement of the pointer due to changes in electromotive force. In my meter, therefore, there will be no relative movement between the pointer and scale due to changes in electromotive force, such relative movement being due only to changes in frequency, so that the frequency of the current can be read directly from the instrument.

Figure 1:
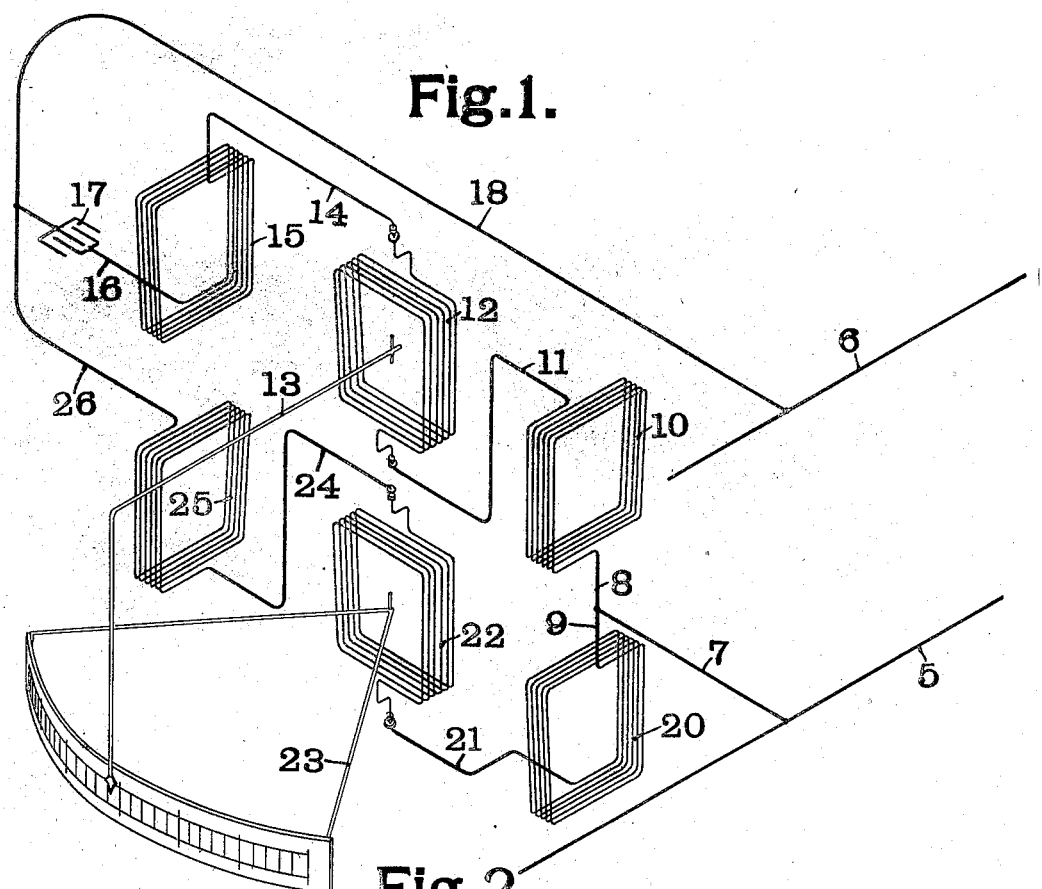
Figure 2:
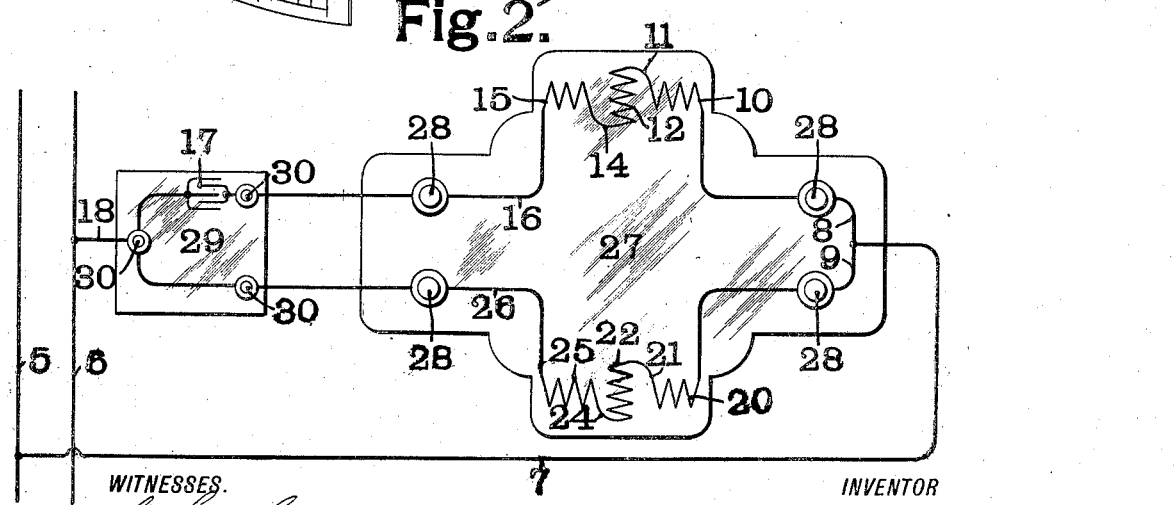

In the accompanying drawings, which illustrate one form of meter made in accordance with my invention, Figure 1 is a diagrammatic view in perspective; and Fig. 2 is a diagrammatic plan view, the pointer and scale being omitted.

Like marks of reference refer to similar parts of both views of the drawings.

5 and 6 represent the line-wires. Leading from the line-wire 5 is a conductor 7, from which lead two conductors 8 and 9, respectively, so that the current passing from the line-wire 5 over the wire 7 divides and takes two separate paths. The portion of the current passing over the conductor 8 passes through a stationary field-coil 10. From the field-coil 10 the current passes through a conductor 11 to a movable coil 12. This movable coil 12 carries a pointer 13. The current after passing through the coil 12 passes through a conductor 14 to a second fixed field-coil 15, symmetrically placed with relation to the movable coil 12 and the field-coil 10. Leading from the field-coil 15 is a conductor 16, containing a condenser 17. The conductor 16 is connected to a conductor 18, which returns to the second line-wire 6, thus completing the circuit through the field-coils 10 and 15, the movable coil 12, and the condenser 17. The remaining portion of the divided current passes through the conductor 9 to a fixed field-coil 20. From the coil 20 the current passes through a conductor 21 to a movable coil 22. This coil 22 is pivoted in a line coaxial with the movable coil 12 and pointer 13 and carries a scale 23, which coöperates with the said pointer 13. The current passes from the movable coil 22 through a conductor 24 to a fixed field-coil 25. The field-coils 20 and 25 are arranged in the same relation to the movable coil 22 that the field-coils 10 and 15, hereinbefore described, bear to the movable coil 12. The current after passing through the field-coil 25 passes over a conductor 26 to the conductor 18, hereinbefore described, and thence returns to the line-wire 6. In practice I prefer to mount the field-coils and movable coils on a base 27, as shown in Fig. 2, said base being provided with suitable binding-posts 28 for connection with the conductors and to mount the condenser 17 on a separate base 29, as shown in said figure, said base being provided with binding-posts 30 for connection with the conductors.

It will be seen that the movement of the coil 12, and consequently of the pointer 13, will vary with the frequency of the current to be measured and also with the variation in electromotive force of said current, while the coil 22 and the scale 23 carried thereby will not be affected by the change in frequency, but will be affected by the change in voltage, so that the direction and amount of movement of said parts due to the change in voltage will be identical with the movement of the parts 12 and 13 due to such change, and consequently that relative movement between the pointer 13 and scale 23 will be due solely to the change in frequency, and consequently such change may be read directly from the said scale 23.

In place of the condenser 17 shown in the drawings I may use an inductance or any other device which will cause the current through the movable coil 12 to vary with the frequency of the current in the main lines 5 and 6, as well as with the voltage in said main lines.

Having fully described my invention, what I claim as new, and desire to secure by Letters Patent of the United States, is—

1. In a frequency-meter, the combination with a pair of coöperative indicating devices, of means for moving one of said indicating devices proportional to the voltage and frequency of the current to be measured, and moving the other of said indicating devices proportional to the voltage of the current to be measured.

2. In a frequency-meter, the combination with a pair of independently-movable coils, of a pair of indicating devices coöperating to indicate the frequency, one of said devices being controlled by each coil, and means in series with one of said coils for varying the current with the frequency.

3. In a frequency-meter, the combination with a pair of independently-movable coils, of a pair of indicating devices coöperating to indicate the frequency, one of said devices being controlled by each coil, and a condenser in series with one of said coils.

4. In a frequency-meter, the combination with a pair of independently movable coils arranged in multiple circuit, of a pair of indicating devices coöperating to indicate the frequency, one of said devices being controlled by each coil, means in series with one of said coils for varying the current with the frequency.

5. In a frequency-meter, the combination with a pair of independently-movable coils arranged in multiple circuit, of a pair of indicating devices coöperating to indicate the frequency, one of said devices being controlled by each coil, and a condenser in series with one of said coils.

6. In a frequency-meter, the combination with a pair of independently-movable coils, of a pair of indicating devices coöperating to indicate the frequency, one of said indicating devices being carried by each coil, and means in series with one of said coils for varying the current with the frequency.

7. In a frequency-meter, the combination with a pair of independently-movable coils, of a pair of indicating devices coöperating to indicate the frequency, one of said indicating devices being carried by each coil, and a condenser in series with one of said coils.

8. In a frequency-meter, the combination with a pair of independently-movable coils arranged in multiple circuit, of a pair of indicating devices coöperating to indicate the frequency, one of said indicating devices being carried by each coil, and means in series with one of said coils for varying the current with the frequency.

9. In a frequency-meter, the combination with a pair of independently-movable coils arranged in multiple circuit, of a pair of indicating devices coöperating to indicate the frequency, one of said indicating devices being carried by each coil, and a condenser in series with one of said coils.

10. In a frequency-meter, the combination with a pair of independently-movable coils, of a scale carried by one of said coils, a pointer carried by the other of said coils and coöperating with said scale to indicate the frequency, and means in series with one of said coils for varying the current with the frequency.

11. In a frequency-meter, the combination with a pair of independently-movable coils, of a scale carried by one of said coils, a pointer carried by the other of said coils and coöperating with said scale to indicate the frequency, and a condenser in series with one of said coils.

12. In a frequency-meter, the combination with a pair of independently-movable coils in multiple circuit, of a scale carried by one of said coils, a pointer carried by the other of said coils and coöperating with said scale to indicate the frequency, and means in series with one of said coils for varying the current with the frequency.

13. In a frequency-meter, the combination with a pair of independently-movable coils in multiple circuit, of a scale carried by one of said coils, a pointer carried by the other of said coils and coöperating with said scale to indicate the frequency, and a condenser in series with one of said coils.

14. In a frequency-meter, the combination with a pair of independently-movable coils, of a field-coil in series with each of said movable coils, pair of indicating devices coöperating to indicate the frequency, one of said indicating devices being controlled by each movable coil, and means in series with one of said movable coils for varying the current with the frequency.

15. In a frequency-meter, the combination with a pair of independently-movable coils, a field-coil in series with each of said movable coils, a pair of indicating devices coöperating to indicate the frequency, one of said indicating devices being controlled by each movable coil, and a condenser in series with one of said movable coils.

16. In a frequency-meter, the combination with a pair of independently-movable coils arranged in multiple circuit, of a field-coil in series with each of said movable coils, a pair of indicating devices coöperating to indicate the frequency, one of said indicating devices being controlled by each movable coil, and means in series with one of said movable coils for varying the current with the frequency.

17. In a frequency-meter, the combination with a pair of independently-movable coils arranged in multiple circuit, a field-coil in series with each of said movable coils, a pair of indicating devices coöperating to indicate the frequency, one of said indicating devices being controlled by each movable coil, and a condenser in series with one of said movable coils.

In testimony whereof I have hereunto set my hand and affixed my seal in the presence of the two subscribing witnesses.

ALEXANDER S. LANGSDORF. [L. S.]

Witnesses:
EDGAR W. JACOBS,
W. A. ALEXANDER.